M. MOEST & R. M. VON BERNECK.
MANUFACTURE OF NITRIC ACID.
APPLICATION FILED JULY 26, 1911.
1,049,754.
Patented Jan. 7, 1913.
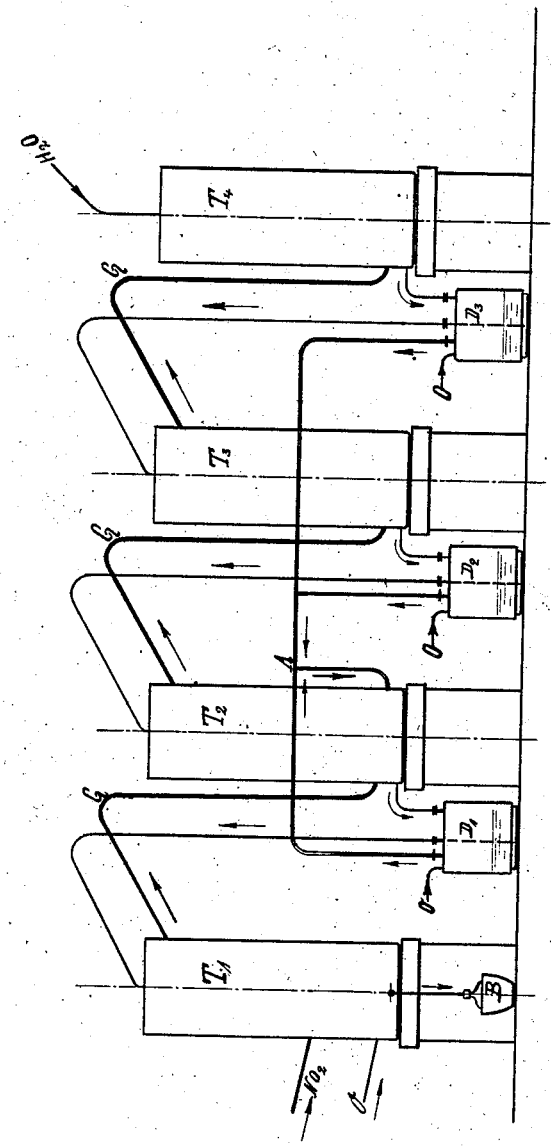

UNITED STATES PATENT OFFICE.

MARTIN MOEST AND RUDOLF MÜLLER von BERNECK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MANUFACTURE OF NITRIC ACID.

1,049,754.  Specification of Letters Patent. Patented Jan. 7, 1913.

Application filed July 26, 1911. Serial No. 640,654.

*To all whom it may concern:*

Be it known that we, MARTIN MOEST, Ph. D., chemist, and RUDOLF MÜLLER VON BERNECK, chemist, citizens of the Empire of Germany, residing at Höchst-on-the-Main, Germany, have invented certain new and useful Improvements in the Manufacture of Nitric Acid, of which the following is a specification.

In the manufacture of concentrated nitric oxid gases, which can now be obtained in a simple and cheap way (see German Patent No. 220539 and German patent application F. 31241), it is advantageous to use pure oxygen instead of atmospheric air for converting these gases into nitric acid in presence of water or aqueous solutions, because a nitric acid of a higher concentration is thereby obtained and also the absorption compartments can be smaller. In that process there are generally used for conveying the liquid into the absorption-vessels, apparatus which are worked by compressed air, for instance acid pulsometers, montejus, or any other similar automatic apparatus. The escaping air is either allowed to escape into the open air, in which case very considerable losses of nitric oxid gases and nitric acid respectively occur, or the escaping air is introduced into the absorption-system. Although in the latter case direct losses of nitric acid are avoided, there is the disadvantage that nitrogen gets into the absorption-system and dilutes the gases. If one is compelled, as it frequently happens in practice, to repeatedly conduct the liquid through the absorption-system, the dilution of the gases by the oxygen introduced may be so much increased that the advantage in using pure oxygen is frustrated. Now we have found that these drawbacks can be obviated by using compressed oxygen instead of compressed air for the conveyance of the absorption liquid, and by reintroducing into the absorption system, simultaneously with the nitric oxid gases or nitric acid vapors which may be drawn along, the oxygen leaving the pressure-vessels. By proceeding in this way, not only losses of nitrogen, but also dilution of the nitric oxid gases in the absorption-systems are avoided. As the oxygen leaving the pressure-apparatus enters again the absorption-system, no additional consumption of oxygen is required, but only the work necessary for compressing the oxygen into the required tension has to be done.

The accompanying drawing illustrates suitable apparatus for executing the new process, the figure being a side elevation.

The absorption chambers $T_1$, $T_2$, $T_3$, and $T_4$, in which the oxids of nitrogen are converted into nitric acid with the aid of water and oxygen, are connected with each other by the gas-pipes G, and water is introduced into the chamber $T_4$, at $H_2O$; oxids of nitrogen at $NO_2$; and oxygen at O. The gases pass through the system in the direction indicated by the arrows adjacent to pipes G, whereas the water and the nitric acid flow in the opposite direction, from the bottom of one chamber, through the lifting apparatus, into the top of the next chamber.

$D_1$, $D_2$ and $D_3$ indicate the apparatus for lifting the nitric acid produced, with the aid of oxygen. The oxygen, after having been used for transporting the nitric acid, is collected by a common conduit A, and is introduced at a suitable point into the system, where it is used for the formation of nitric acid with oxidation of the oxids of nitrogen. The finished product is drawn off from chamber $T_1$ at B.

It is to be understood that the expression "in presence of water," occurring in the claim, is a general one, and is intended to include aqueous solutions as well.

Having now described our invention, what we claim is:

In the process of manufacturing nitric acid from nitric oxids and oxygen in presence of water, the steps which consist in charging with oxygen the apparatus serving for the conveyance of the liquid in the absorption-systems, and in re-introducing into the absorption-system the oxygen leaving the apparatus, simultaneously with the entrained vapors containing nitric acid.

In testimony whereof, we affix our signatures in presence of two witnesses.

MARTIN MOEST.
RUDOLF MÜLLER VON BERNECK.

Witnesses:
JEAN GRUND,
CARL GRUND.